United States Patent [19]

McGrath et al.

[11] Patent Number: 5,427,581
[45] Date of Patent: Jun. 27, 1995

[54] INDEPENDENTLY STEERABLE IDLER PULLEY

[75] Inventors: Howard F. McGrath, Springfield; Alan K. Wosky, East Longmeadow, both of Mass.

[73] Assignee: Belt Technologies, Inc., Mass.

[21] Appl. No.: 289,432

[22] Filed: Aug. 12, 1994

[51] Int. Cl.$^6$ .............................................. F16H 7/00
[52] U.S. Cl. ..................................... 474/101; 474/112
[58] Field of Search ............................... 474/101–106, 474/112; 384/447, 255

[56] References Cited

U.S. PATENT DOCUMENTS 2,691,553 10/1954 Pettigrew .................. 474/112 X
3,467,450 9/1969 Schmidt et al. .................. 384/447
4,923,435 5/1990 Kadota et al. ...................... 474/112

*Primary Examiner*—Michael Powell Buiz
*Attorney, Agent, or Firm*—Ross, Ross & Flavin

[57] ABSTRACT

An independently steerable idler pulley is operable by the means of a non-concentric adjustable inner sleeve bushing mounted interiorly of a radial ball bearing fitted within the ID of the pulley, with the sleeve bushing and bearing and pulley press fitted as an assembly for mounting on an idler shaft. The sleeve is movable in defining the angular alignment adjustment of the assembly with respect to the shaft upon which it is mounted. With the desired angular adjustment determined the sleeve is locked upon the shaft. Plural of such pulleys supported on a common shaft can be individually positioned.

3 Claims, 2 Drawing Sheets

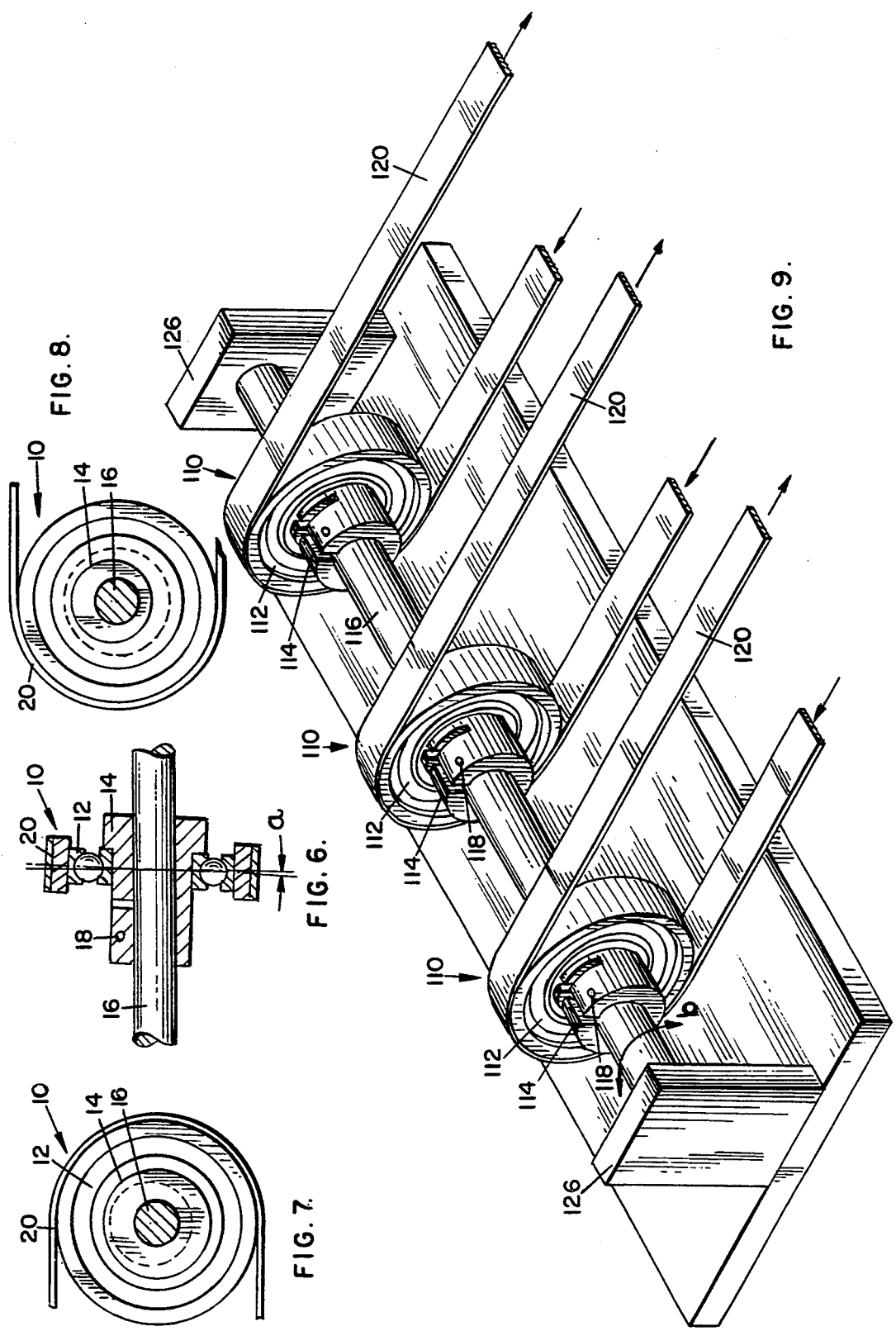

INDEPENDENTLY STEERABLE IDLER PULLEY

BACKGROUND OF THE INVENTION

1. Field of the Invention

The field of the invention relates to pulley systems with the view to overcoming conditions particularly encountered in such as power transmission and indexing metal belt systems.

2. Description of the Prior Art

U.S. Pat. No. 3,467,450 to Schmidt et al shows an eccentrically adjustable roller. Bushing 30 is eccentric. This eccentricity is constant over the width of the bushing and herein lies the difference over the present invention. In a standard two pulley metal belt system, the teaching would only change the tension in the system due to the constant eccentricity. Contrariwise, in the present invention, it will become apparent that a skew angle provides for the pivotal action so necessary in order to allow for tracking adjustment.

U.S. Pat. No. 2,279,887 to Hathorn shows an adjustable mounting for rotational members. There the teaching is of a pulley/bearing assembly which is allowed to pivot between a set of spherical washers. Accordingly, the necessary tracking characteristics are met in a standard two pulley system. This patent achieves the principles as will be seen in the approach taught in the present invention, but, and this is significant, through a different means. As will appear, the system of this invention varies with reference to the mounting of multiple pulleys on a common shaft. In the reference patent, the adjustments depend on the loosening of a bolt and nut assembly (10 and 16) so that all of the pulleys float freely. As will appear hereinfollowing, the teaching of the present invention allows each pulley to be adjusted independently of each other and this is accomplished simply by rotating the bushing about the stationary shaft.

U.S. Pat. No. 3,064,487 to Warrick et al generally follows the concept of U.S. Pat. No. 3,467,450, but employs a more elaborate process. In this case, an adaptor is used consisting of a bore 225 and a shaft 228 eccentric as to each other. As the table saw height and angle change, the motor mount rotates the eccentric adaptor through a torsion spring so as to maintain a constant belt tension on the jointer side of the machine. As in the case of U.S. Pat. No. 3,467,450, the eccentric is constant, resulting in a tension adjustment of the system as the adaptor is rotated. But this adaptor could not track a belt because the eccentricity is constant and would only adjust the tension in a two pulley system.

U.S. Pat. No. 1,171,347 to Morse teaches an adjustable bearing and coupling for a pulley. An eccentric bearing member 8 has a constant eccentricity through its width. The eccentric is not skewed so that it will not track a belt, unlike the individually steerable pulley of this invention.

U.S. Pat. No. 240,898 to Fairfield teaches a flywheel and bearing for a sewing machine stand. It takes up for bearing wear by the use of a conical washer which is adjustable via a bolt and set-nut. It has no application for a system for tracking a belt.

As such, it may be appreciated that there is and continues to be a need for a new and improved independently steerable idler pulley as set forth by the instant invention which addresses a) the effect which a belt's camber, or lack of edge straightness, has on the dynamic alignment of the belt to the pulley during operation, 2) any parallelism misalignment between the drive and idler shafts, and c) one dimensional eccentricity of the pulley outer diameter to the pulley bore.

Accordingly, there is a need for a new and improved system as set forth by the present invention which addresses both the problems of ease of use as well as effectiveness of structure and, in this respect, the present invention substantially fulfills this need.

SUMMARY OF THE INVENTION

In view of the foregoing disadvantages inherent in the known types of bearing mountings now present in the prior art, the present invention provides a system which will allow easily adjustable individual idler pulley alignment, ergo the selected nomenclature "independently steerable idler pulley".

The effect of the conditions above referred to, and herein addressed, may be noticed only hardly, if at all, in most elastomeric belt systems.

However, when it comes to metal belt systems and other belt systems employing relatively non-compliant materials such as employed in sanding or grinding belts fabricated from stiff, woven polyester material, the effect of the conditions is definitely pronounced and troublesome. A frequent result is an inability to keep the belt in its proper mounted position on its pulley during operation.

It should here be explained that the manufacture of a metal belt as a perfect cylinder in configuration is not a practicality. All belts have camber and this produces more or less of a cone shape leading to the above referred to instability in a two pulley system.

The individual steerable pulley had its genesis in the effort to solve the problem.

In a single metal belt system, where a single pulley is mounted on the drive and idler shafts, compensation can often be made, albeit with difficulty, by altering the mounting alignment of one or the other or both of the shafts.

In a multiple metal belt system, where several pulleys are mounted on each of the drive and idler shafts, such a method of correction is impractical. This is for the reason that the pulley pair for each belt must be given its own individual straightness or camber characteristics of the particular belt running on that particular drive pulley/idler pulley pair.

The system hereof envisions a bushing fabricated as a skew with respect to its outer diameter. The skew angle allows a constantly changing eccentricity of the bushing bore relative to the bore outer diameter.

As the bushing is rotated about its axis, the skew angle will be translated to the pulley, all leading to the required pivotal motion to track the belt.

Our invention resides not in any one of the features per se, but rather in the particular combination of all of them herein disclosed and claimed and it is distinguished from the prior art in this particular combination of all of its structures for the functions specified.

There has been outlined, rather broadly, the more important features of the invention in order that the detailed description thereof which follows may be better understood and in order that the present contribution to the art may be better appreciated.

Those skilled in the art will appreciate that the conception, upon which the disclosure is based, may readily be utilized as a basis for the designing of other structures, methods and systems for carrying out the purpose of the invention.

It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a cross-sectional view similar to FIG. 3, with the bushing rotated 90° about its axis;

FIG. 7 is an end elevational view as seen from the right of FIG. 6;

FIG. 8 is an end elevational view as seen from the left of FIG. 6; and

FIG. 9 is an isometric showing of multiple pulleys embodying the invention mounted on a common shaft and illustrating the tracking of multiple metal belts.

DESCRIPTION OF THE PREFERRED EMBODIMENT

Figure 1:
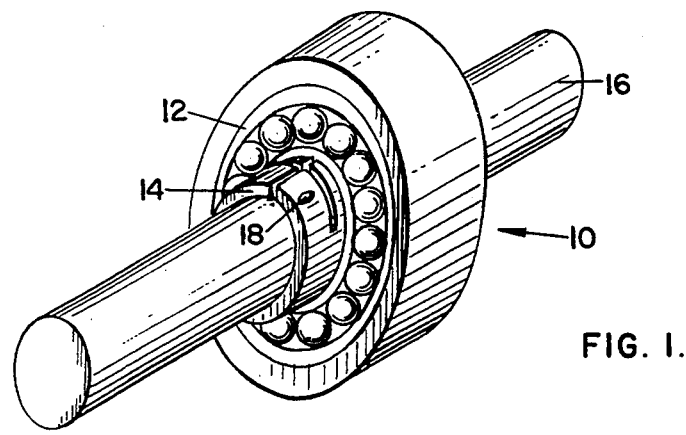
FIG. 1 is an isometric showing of a pulley and radial bearing and bushing embodying the invention mounted upon an idler shaft.

With reference now to the drawings, and in particular to FIG. 1 thereof, a new and improved structure and system embodying the principles and concepts of the present invention will be described.

The individual steerable pulley consists of three components: 1) a pulley 10 on which a metal belt, not shown, travels; 2) a radial ball bearing 12 sleeved by the pulley; and an adjusting inner sleeve bushing 14 sleeved by bearing 12.

Radial ball bearing 12 allows for rotational movement between pulley 10 and inner sleeve bushing 14; and inner sleeve bushing 14 provides for angular pivoting of pulley 10 relative to what is shown as an idler shaft 16.

Adjusting inner sleeve bushing 14 is non-concentric in configuration.

The inner sleeve/radial bearing/pulley components are press fitted as an assembly which is mounted on idler shaft 16 by the sliding of the shaft into the bore of inner sleeve bushing 14, and the sleeve is locked in position on the shaft by such as locking means 18.

Figure 2:
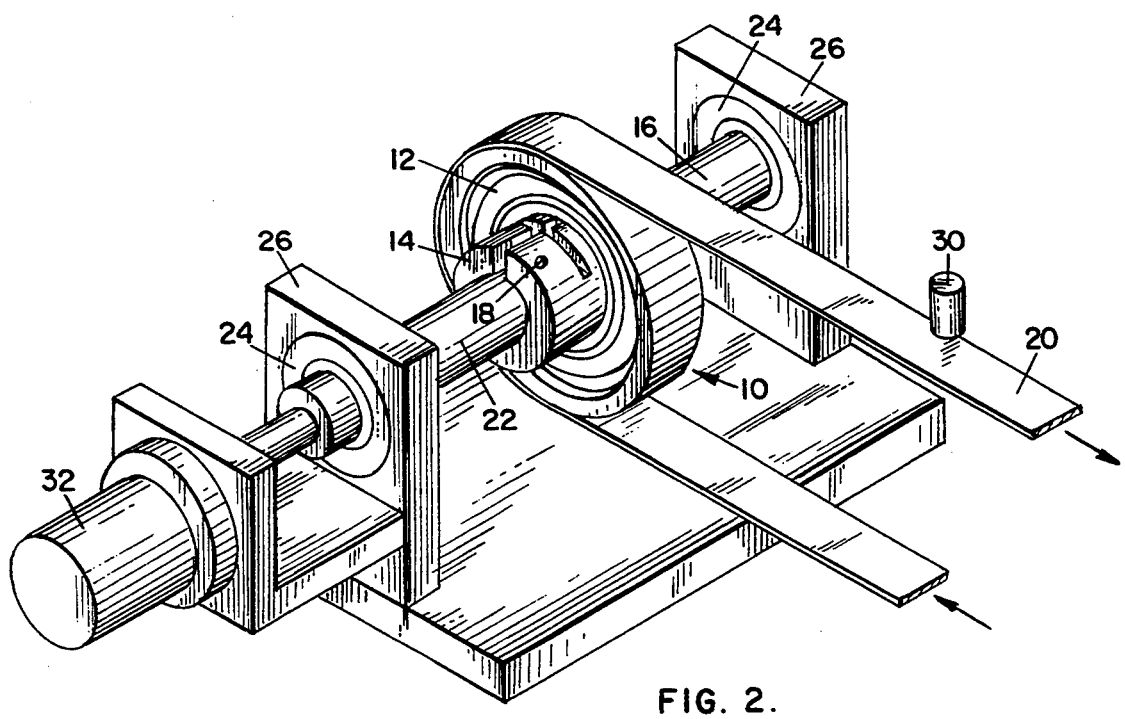
FIG. 2 is an isometric showing of a pulley embodying the invention illustrating the dynamic tracking of a metal belt.

FIG. 2 illustrates the dynamic tracking of a metal belt 20 rotating around pulley 10 mounted relative to radial ball bearing 12 and bushing 14 on a driven shaft 22 journalled in bearings 24 in support posts 26.

Belt 20 is entrained at its opposite end about a similar shaft mounted pulley, not shown.

An edge sensor 30 is strategically positioned adjacent an edge of the leading side of belt 20 for the delivery of any lateral shifting of the belt as input to a conventional controller, not shown.

A servo motor 32 receives the controller's output to effect positioning of the belt by rotating the shaft/bushing assembly.

Alternatively, the servo motor may be omitted and the bushing assembly rotated manually.

Operationally, nonconcentric inner sleeve bushing 14 is rotatable on shaft 22 to provide an angular alignment adjustment of the inner sleeve/radial bearing/pulley assembly relative to the shaft upon which it is mounted.

The easy adjustment of the assembly means that the individual pulley alignment can be readily made for one of the idler pulleys.

Figure 4:
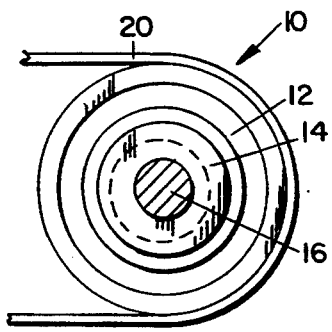
FIG. 4 is an end elevational view as seen from the right of FIG. 3.
Figure 3:
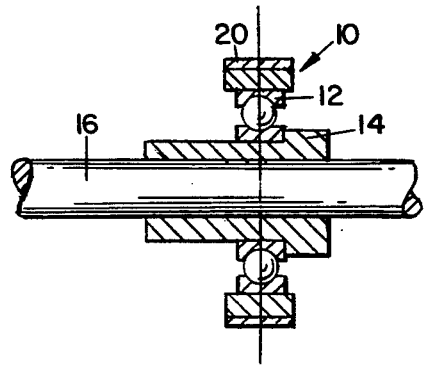
FIG. 3 is a cross-sectional view, on a smaller scale, taken through the pulley of FIG. 2.
Figure 5:
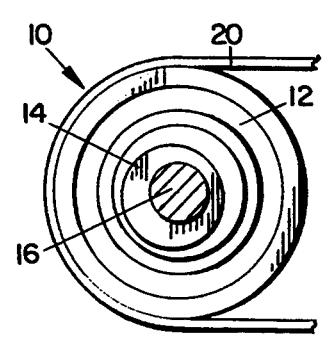
FIG. 5 is an end elevational view as seen from the left of FIG. 3.

FIGS. 3-5 show the relationship of inner sleeve bushing 14 and radial bearing 12 relative to idler shaft 16 in one position of adjustment.

It will be observed that the bushing is fabricated so as to define a bore which is concentric relative to shaft 16 at one end of the bushing and eccentric relative to the shaft at the opposite end of the bushing to provide a constantly changing bore eccentricity.

Thus, the eccentricity through the bushing length gradually varies from true concentricity at one end to non-concentricity at the opposite end so as to define a skew angle which allows the requisite pivotal movement desired for the proper tracking of the belt or belts being trained over the idler shaft.

Operationally, as the bushing rotates about its axis, the skew angle will be seen to be translated to the pulley. In this way the pivotal motion will allow the tracking of the belt.

This feature is illustrated in FIGS. 6-8, wherein inner sleeve bushing 14 has been rotated 90° about the axis of shaft 16 to provide a skew angle a to the pulley to allow for better tracking of belt 20.

FIG. 9 is an isometric showing of multiple pulleys 110 embodying the invention with each pulley sleeving a radial bearing 112 which sleeves an adjustable sleeve bushing 114 having locking means 118.

Each pulley 110 is mounted on a common idler shaft 116 which extends between support posts 126, the pulleys each tracking a metal belt 120 entrained about similar pulleys, not shown, at their opposite ends mounted on a drive shaft, also not shown, for imparting rotative motion to the pulleys and linear movement to the belts.

Each of the pulleys 110 is adjustable relative to shaft 116 by appropriate manual rotation of its adjustable sleeve bushing 114 in the direction of arrow b to maintain proper tracking.

I claim:

1. An independently steerable idler pulley for accommodating a belt relative to a shaft comprising in combination:

a pulley over which the belt travels, a non-concentric inner sleeve bushing, a radial bearing disposed between the pulley and bushing for allowing rotational motion between the pulley and bushing, the pulley and bushing and bearing being press fitted together as an assembly mountable on the shaft, the bushing being adjustably lockable relative to the shaft for proper tracking of the belt and having a bore which varies from true concentricity at one end to non-concentricity at its opposite end to define a skew angle which allows its pivotal movement and positioning for the proper tracking of the belt.

2. An independently steerable idler pulley according to claim 1, wherein the belt is fabricated from a non-compliant material such as metal.

3. An independently steerable idler pulley according to claim 1, there being a plurality of pulleys mounted on a common shaft, each pulley being independently adjustable relative to the shaft for proper tracking of its belt.

* * * * *